United States Patent
Codina

[15] 3,664,196
[45] May 23, 1972

[54] ACCELEROMETER

[72] Inventor: Jorge G. Codina, 223 Secor Road, Hartsdale, N.Y. 10530

[22] Filed: July 31, 1970

[21] Appl. No.: 59,919

Related U.S. Application Data

[63] Continuation-in-part of Ser. No. 710,155, Mar. 4, 1968.

[52] U.S. Cl.................................................73/517 B, 308/10
[51] Int. Cl............................................................G01p 15/08
[58] Field of Search.................73/516, 517 B, 517 R; 308/10

[56] References Cited

UNITED STATES PATENTS 2,919,583    1/1960    Parker..........................73/517 B UX Primary Examiner—James J. Gill
Attorney—Bacon & Thomas

[57] ABSTRACT

An accelerometer for measuring the acceleration of a body in any direction with extremely high sensitivity and accuracy, utilizing a mass which is free to move incrementally in any direction but which is then returned to a stable position by means of a servo-controlled electromagnetic field.

7 Claims, 8 Drawing Figures

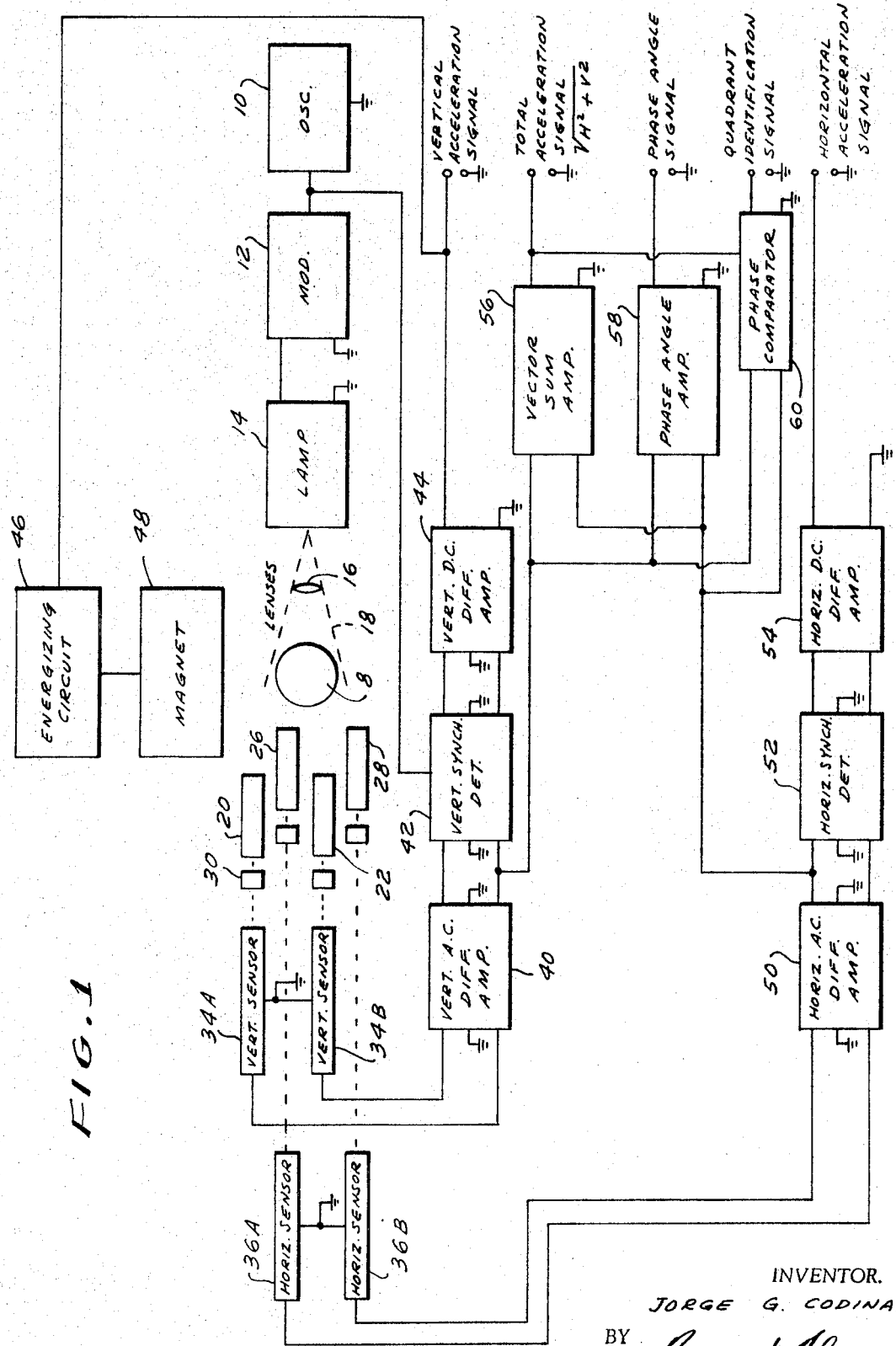

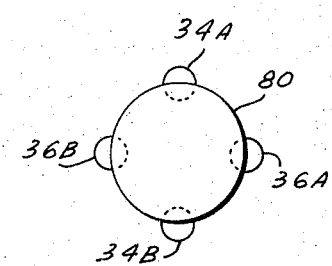
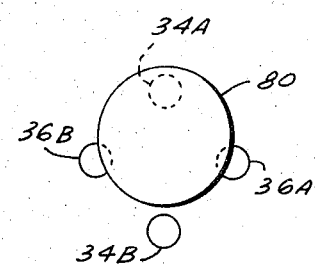
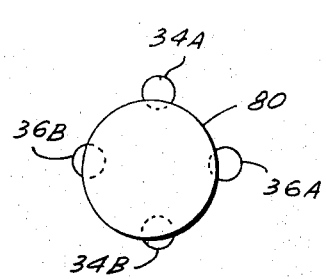
FIG. 2a    FIG. 2b    FIG. 2c
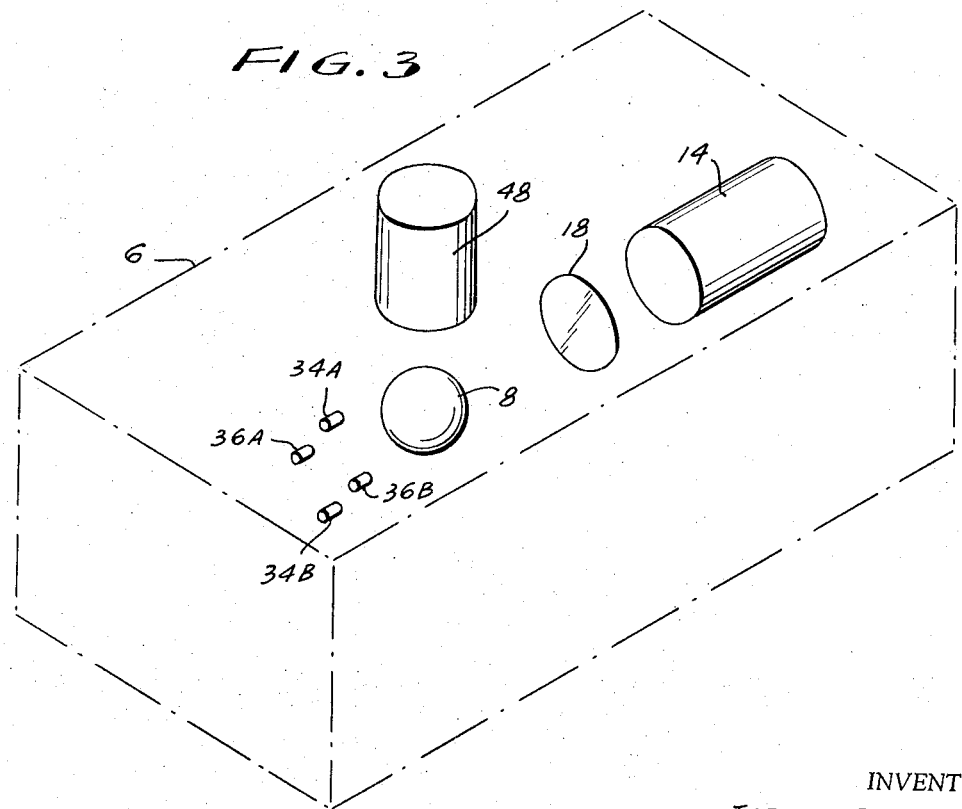
FIG. 3
INVENTOR.
JORGE G. CODINA
BY Bacon & Thomas
ATTORNEYS

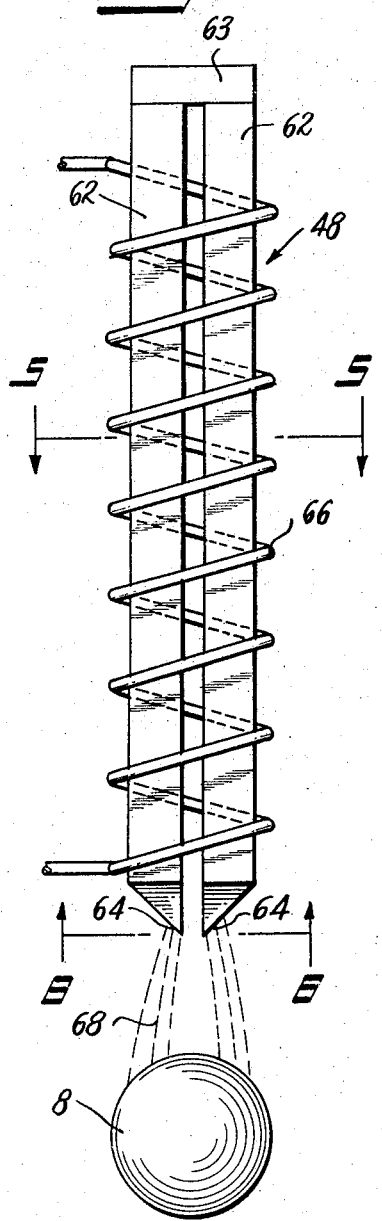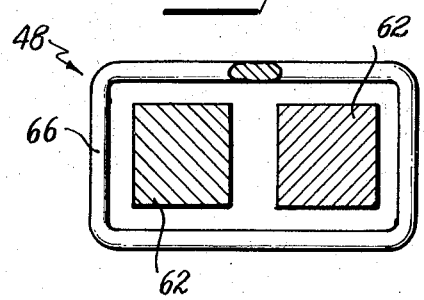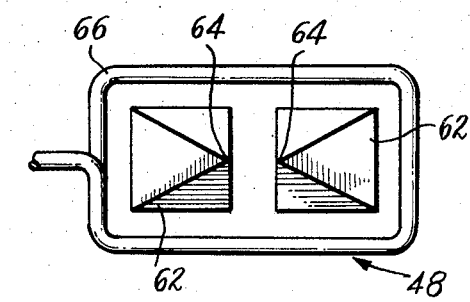

3,664,196

ACCELEROMETER

This is a continuation-in-part of Pat. application Ser. No. filed Mar. 4, 1968.

SUMMARY OF THE INVENTION

My accelerometer comprises an electromagnet adapted to produce a levitational magnetic field directed downward therefrom. First means is coupled to the electromagnet to energize same and is responsive to a variable feedback signal to vary the magnetic field intensity.

A magnetic body is positioned below the electromagnet and is subject both to the levitational force of the field and an oppositely directed gravitational force whereby the body is positioned within a predetermined vertical zone spaced apart from and below the magnet.

First body position indication means, rendered responsive when the body is positioned within the zone, generates a first output signal varying with incremental changes in vertical position of the body in the zone produced by vertical acceleration of the body. Consequently the first output signal varies with and represents the value of the instantaneous vertical acceleration.

Second body indication means, also rendered responsive when the body is positioned in the zone, generates a second output signal varying with incremental changes in horizontal position of the body within the zone produced by horizontal acceleration of the body. Consequently the second output signal varies with and represents the value of the instantaneous horizontal acceleration.

Second means coupled between the first indication means and the first means derives the feedback signal from the first output signal and supplies the feedback signal to the first means. The feedback signal acts in opposition to the action of the levitational field to prevent the body from escaping from the zone.

Additional means can be provided to derive from the first and second output signals a third output signal which represents the instantaneous vectorial sum of the horizontal and vertical accelerations of the body and thus represents the total instantaneous acceleration.

My accelerometer utilizes only the magnetic field as a restraint upon the movement of the body and employs no mechanical restraining devices, gases, or liquids for damping. It is small, compact, light in weight and yields signals which can be used either to actuate meters or the like directly or to be fed directly into a computer for processing.

BRIEF DESCRIPTION OF THE DRAWINGS

In the drawings:

FIG. 1 is a block diagram of my accelerometer;

FIGS. 2a, 2b, and 2c are detail views illustrating certain relationships between a magnetic body, a light beam and optical sensors as required in my accelerometer;

FIG. 3 is an enlarged schematic perspective view of one physical embodiment of my accelerometer;

FIG. 4 is a schematic view of the magnet for my accelerometer;

FIG. 5 is a sectional view along the line 5—5 of FIG. 4; and

FIG. 6 is an end view as seen from the line 6—6 of FIG. 4.

DETAILED DESCRIPTION OF PREFERRED EMBODIMENTS

Referring now to FIGS. 1 and 3 a magnetic sphere 8 is disposed within a transparent vacuum tight chamber 6. An oscillator 10 produces an oscillatory signal of constant frequency. This signal is supplied to the input of modulator 12 which actually functions as a chopper to interrupt the signal at a constant rate. The interrupted signal is then supplied to light source 14 of narrow bandwidth (which is substantially monochromatic) whereby pulsating light is emitted from the source. This pulsating light impinges upon lens system 16 which converts the incident light into a cone of light 18 having a horizontal axis aligned with the center of the sphere and having in a vertical cross section aligned with the vertical axis of the sphere, the shape of a circle with a diameter larger than that of the sphere. The light passing around the sphere impinges upon one end of each of first and second horizontally extending parallel flexible light conduits 26 and 28 which lie in a horizontal plane and which are aligned with opposite points on the sphere periphery. This light further impinges upon one end of each of first and second horizontally extending light conduits 20 and 22 which are parallel to conduits 26 and 28, which lie in a vertical plane and which are aligned with opposite points on the sphere periphery.

Sphere 8 is positioned in a vertical zone in the chamber in the path of the beam because of the levitational action described in more detail hereinafter.

Each of the opposite ends of conduits 26, 28, 20 and 22 is disposed adjacent a separate narrow band optical filter 30 which in turn is disposed adjacent a corresponding photosensor. Conduits 26 and 28 are associated with a first pair of horizontal sensors 36A and 36B while conduits 20 and 22 are associated with a second pair of vertical sensors 34A and 34B.

The outputs from sensors 34A and 34B are fed through an alternating current vertical differential amplifier 40 to a vertical synchronous detector 42 (which also receives a signal from oscillator 10). The outputs from detector 42 are fed to a direct current vertical differential amplifier 44 which yields a first vertical acceleration output signal. This signal is also fed to an energizing circuit 46 which is coupled at its output to an electromagnet 48 which is disposed at the top of chamber 6. This magnet produces a levitational magnetic field which is symmetric about a vertical axis with the vertical axis of the sphere when in stable position. This field exerts a levitational action on sphere 8 which counterbalances the downward pull of the total weight of the sphere whereby it is held in the designed vertical zone. Magnet 48 is contoured, as will be described, so that the field intensity for a given excitation has an extreme value at the vertical axis of symmetry (i.e., either a maximum or a minimum) and varies continually (either increasing from the minimum or decreasing from the maximum) with continuing radial displacement in any direction from the vertical axis of symmetry. Such a field variation with lateral displacement will be termed a monotonically varying field.

As shown in FIGS. 4–6, the magnet 48 comprises a pair of vertical iron bars 62, having a "keeper" structure 63 spanning their upper ends, being only slightly spaced from each other and being pointed at their lower ends 64, as seen in FIGS. 4 and 6. The pointed lower ends taper downwardly and inwardly toward each other. As shown, the bars 62 are preferably square in section. Numeral 66 indicates the coil fed by energizing circuit 46. Numeral 68 indicates the split levitational field produced by the magnet 48.

The outputs from sensors 36A and 36B are fed through an alternating current horizontal differential amplifier 50 to a horizontal synchronous detector 52 (which also receives a signal from oscillator 10). The outputs from detector 52 are fed to a direct current horizontal differential amplifier 54 which yields a second horizontal acceleration output signal.

One output signal from amplifier 40 and one output signal from amplifier 50 are both fed as inputs to a vector sum amplifier 56, to a phase angle amplifier 58 and to a phase comparator 60. Computator 60 is a standard component as described on page 87 of the 1965 Edition of Electronic Circuit Design Handbook published in New York City by Mactier Publishing Co.

Amplifier 56 is a conventional quadratic operational amplifier which produces an output voltage which is proportional to the square root of the sum of the squares of its two input voltages. Thus, as will be explained below, this voltage is proportional to the absolute value of the vectorial sum of the horizontal and vertical accelerations and hence to the total acceleration of the sphere.

Amplified 58 is a conventional operational amplifier which produces an output voltage proportional to the ratio of the vertical to the horizontal acceleration which is the tangent of the phase angle.

For the purposes of clarity, the conventional power supply energizing the magnet and the various units shown in block form in FIG. 1 as well as the conventional connections of the supply to the magnet and units have been omitted and will not be referred to herein.

Referring now to FIG. 2a, the light beam as it passes around the sphere and impinges upon the four conduits defines an annular ring of light, the inner periphery of which is shown at 80. When the sphere is exactly centered, all conduits received the same amount of light and with all photosensors being exactly matched, the output signals from all sensors are identical and the alternating differences signals yielded at the outputs of the horizontal and vertical alternating current differential amplifiers are zero. As a result the vertical and horizontal acceleration as well as the total acceleration and phase angle signals are all zero; i.e., zero acceleration.

When as shown in FIG. 2b, the sphere is subject to vertically upward acceleration, the sphere moves upward incrementally, and the amount of light on conduit 20 decreases while the amount of light on conduit 22 increases. (The amounts of light on conduits 26 and 28 remain unchanged whereby the horizontal acceleration signal remains zero). The resultant inequality of the inputs from sensors 36A and 36B produces an alternating difference signal having an instantaneous magnitude determined by the relative amounts of light on conduits 20 and 22. This signal after detection and amplification results in a vertical acceleration output signal of one polarity. The polarity indicates the upward direction and the magnitude represents the magnitude of vertical acceleration.

Should the sphere move downward, the same action will occur but the polarity of the vertical output signal will be reversed. In either situation, the vertical output signal also functions as a feedback signal to the energizing circuit to vary the intensity of the magnetic field in such manner as to restore the sphere to the center position.

FIG. 2c illustrates the position of the sphere when subject to horizontal acceleration. As the sphere moves incrementally and horizontally along a line perpendicular to the horizontal conduits, the amount of light on one of conduits 26 and 28 increases while the amount on the other one of these conduits decreases, thus producing a horizontal acceleration output signal of one or another polarity in the manner described. However, even when no vertical acceleration is present, because of the contoured magnetic field, the sphere must move vertically and incrementally whenever it moves horizontally, and the resultant changes in the vertical output signal generates the feedback required to restore the sphere to the center position.

When the sphere is subject both to horizontal and vertical acceleration, the action is the same as in FIG. 2c except that the vertical movement is more pronounced.

Since the circuitry must distinguish between changing signals in the vertical acceleration determining units produced by only horizontal acceleration, and those produced by combined horizontal and vertical acceleration, it is necessary to calibrate these units prior to acceleration determining use.

The device can be calibrated by first subjecting the body to known vertical accelerations and measuring the resultant vertical acceleration signals. The body is then subjected to known horizontal accelerations and the resultant vertical and horizontal signals are measured. Charts can then be prepared enabling computations of any acceleration to be made from the values of the various acceleration signals that are produced. If desired, the various electronic components can be adjusted to have the equivalent of such charts "built in" or a computer can be programmed to accept the various output signals and perform the computations automatically.

The two acceleration signals, horizontal and vertical, are individually squared and added together in squared form in the amplifier 46 which then derives from this sum a voltage proportional to the square root of this sum. This voltage is then the total acceleration signal and is proportional to the magnitude of the total acceleration vector.

In order to completely define the total acceleration vector, it is necessary to determine both the phase angle of the vector and the quadrant in which the vector is located. Amplifier 58, as described previously, provides an output signal which identifies the angle but not the quadrant. Amplifier 60 compares the instantaneous polarities of the vertical and horizontal accelerations and that of the total acceleration to determine the particular quadrant. This is carried out by a series of polarity comparisons, first between the horizontal and vertical accelerations, second between the results of the first comparison and the total acceleration, and third between the results of the second comparison and one of the accelerations.

While I have described my invention with particular reference to a preferred embodiment many variations within the scope and sphere of my invention will be apparent to those skilled in the art.

I claim:

1. An accelerometer comprising:
   a. an electromagnet adapted to produce a levitational magnetic field directed downward therefrom, said levitational field being contoured in a manner such that the field intensity for a given excitation has an extreme value at a vertical axis of symmetry, said value varying monotonically with radial displacement from said axis;
   b. first means coupled to said electromagnet to energize same and being responsive to a variable feedback signal to vary the magnetic field intensity, the intensity varying monotonically with variations of said feedback signal;
   c. a magnetic body positioned below said magnet and being subject both to the levitational force of said field and an oppositely directed gravitational force whereby the body is positioned within a predetermined vertical zone spaced apart from and below the magnet;
   d. first body position indication means rendered responsive when said body is positioned within said zone to generate a first output signal varying with incremental changes of vertical acceleration of the body and thus varying with said vertical acceleration;
   e. second body indication means rendered responsive when said body is positioned in the zone to produce a second output signal varying with incremental changes of horizontal acceleration of the body and thus varying with the horizontal acceleration, the incremental changes in horizontal body position, due to the field contour, always being accompanied by incremental changes in vertical body position whereby the first output signal can be produced in the absence of the second output signal but the second output signal is always accompanied by the first output signal; and
   f. second means coupled between said first indication means and said first means to obtain said feedback signal from said first output signal and to supply said feedback signal to said first means, said feedback acting in opposition to the acceleration of said body to prevent said body from escaping from the zone.

2. An accelerometer as set forth in claim 1 further including a light source spaced across said zone, said beam being partially intercepted by said body whereby the beam as viewed from the side of the body opposite to the side adjacent the source has first and second vertically spaced horizontally extending components and third and fourth horizontally spaced horizontally extending components disposed in vertically aligned positions parallel to but disposed intermediate the first and second components, the second indication means being responsive to said third and fourth components.

3. An accelerometer is set forth in claim 2 wherein the first indication means includes a first electro-optical transducer system responsive to said first and second beam components to produce said first output signal and the second indication means includes a second electro-optical transducer system responsive to said third and fourth beam components to produce said second output signal.

4. An accelerometer as set forth in claim 3 further including means responsive to said first and second output signals to derive therefrom a third output signal representing the vectorial sum of the horizontal and vertical accelerations of the body.

5. An accelerometer as set forth in claim 4 further including means responsive to any two of said output signals to produce a phase angle signal.

6. An accelerometer as set forth in claim 5 further including means responsive to all three output signals to produce a quadrant identification signal.

7. An accelerometer as set forth in claim 6 wherein said zone is disposed in a vacuum chamber.

* * * * *